(12) United States Patent
Lynar et al.

(10) Patent No.: US 10,785,546 B2
(45) Date of Patent: Sep. 22, 2020

(54) OPTIMIZING PRODUCT PLACEMENT IN A MEDIA

(71) Applicant: International Business Machines Corporation, Armonk, NY (US)

(72) Inventors: Timothy Lynar, Alfred St. Kew (AU); Stefan von Cavallar, Sandringham (AU); John Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/582,930

(22) Filed: May 1, 2017

(65) Prior Publication Data
US 2018/0316982 A1 Nov. 1, 2018

(51) Int. Cl.
| | | |
|---|---|---|
| H04N 21/81 | (2011.01) | |
| H04N 21/258 | (2011.01) | |
| G06F 16/783 | (2019.01) | |
| H04N 21/234 | (2011.01) | |
| H04N 21/44 | (2011.01) | |
| H04N 21/431 | (2011.01) | |

(52) U.S. Cl.
CPC ....... *H04N 21/812* (2013.01); *G06F 16/7837* (2019.01); *H04N 21/23418* (2013.01); *H04N 21/23424* (2013.01); *H04N 21/25883* (2013.01); *H04N 21/25891* (2013.01); *H04N 21/4318* (2013.01); *H04N 21/44008* (2013.01)

(58) Field of Classification Search
CPC ....... H04N 21/23418; H04N 21/23424; H04N 21/4318; H04N 21/44008; H04N 21/812
See application file for complete search history.

(56) References Cited

U.S. PATENT DOCUMENTS

| 8,949,889 B1* | 2/2015 | Erdmann | H04N 21/25883 725/22 |
|---|---|---|---|
| 9,251,790 B2 | 2/2016 | Huseby et al. | |
| 9,300,987 B1 | 3/2016 | Matarese et al. | |
| 2003/0028873 A1* | 2/2003 | Lemmons | H04N 7/17318 725/36 |
| 2005/0220439 A1* | 10/2005 | Carton | G11B 27/329 386/240 |
| 2006/0136305 A1* | 6/2006 | Fitzsimmons | G06Q 30/02 705/26.1 |
| 2008/0033801 A1* | 2/2008 | McKenna | H04N 21/23412 705/14.4 |
| 2010/0306030 A1* | 12/2010 | Mawani | G06Q 30/02 705/14.41 |
| 2013/0091519 A1* | 4/2013 | McLauchlan | H04N 21/812 725/32 |

(Continued)

FOREIGN PATENT DOCUMENTS

JP 2016005015 A 1/2016

*Primary Examiner* — Jeremy S Duffield
(74) *Attorney, Agent, or Firm* — Jeffrey M. Ingalls

(57) ABSTRACT

A computer-implemented method includes determining a characteristic of a target audience for a viewing of a visual media, extracting a frame of the visual media from an electronic signal, identifying an object that is visible in the frame of the visual media, and digitally inserting an item of advertising content into the frame of the visual media, in a region of the object, wherein a selection of the item of advertising content has been optimized for at least the characteristic of the audience.

13 Claims, 3 Drawing Sheets

(56) References Cited

U.S. PATENT DOCUMENTS

| | | | |
|---|---|---|---|
| 2015/0254564 A1* | 9/2015 | Rodriguez | G06Q 10/06 706/52 |
| 2015/0334523 A1* | 11/2015 | Lappetelainen | H04W 4/80 455/456.1 |
| 2016/0027064 A1* | 1/2016 | Zazza | G06Q 30/0269 705/14.66 |
| 2016/0029061 A1 | 1/2016 | Pizzuro et al. | |
| 2016/0112729 A1* | 4/2016 | Sayed | H04N 21/23434 725/10 |
| 2016/0212455 A1 | 7/2016 | Manna | |

* cited by examiner

OPTIMIZING PRODUCT PLACEMENT IN A MEDIA

BACKGROUND OF THE INVENTION

Product placement (also sometimes referred to as "brand integration" or "embedded marketing") is an advertising technique in which a commercial product is placed in a scene of a media (e.g., a film, a television program, or other media). Product placement is generally considered to be less obtrusive than a conventional commercial advertisement, because it allows for the product to be promoted without interrupting the media being viewed.

SUMMARY OF THE INVENTION

A computer-implemented method includes determining a characteristic of a target audience for a viewing of a visual media, extracting a frame of the visual media from an electronic signal, identifying an object that is visible in the frame of the visual media, and digitally inserting an item of advertising content into the frame of the visual media, in a region of the object, wherein a selection of the item of advertising content has been optimized for at least the characteristic of the audience.

In another example, a machine-readable storage medium is encoded with instructions executable by a processor. The instructions include instructions to determine a characteristic of a target audience for a viewing of a visual media, instructions to extract a frame of the visual media from an electronic signal, instructions to identify an object that is visible in the frame of the visual media, and instructions to digitally insert an item of advertising content into the frame of the visual media, in a region of the object, wherein a selection of the item of advertising content has been optimized for at least the characteristic of the audience.

In another example, an apparatus includes a hardware processor element and a plurality of programming code components that, when executed by the hardware processor element, cause the hardware processor element to perform operations. The operations include determining a characteristic of a target audience for a viewing of a visual media, extracting a frame of the visual media from an electronic signal, identifying an object that is visible in the frame of the visual media, and digitally inserting an item of advertising content into the frame of the visual media, in a region of the object, wherein a selection of the item of advertising content has been optimized for at least the characteristic of the audience.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one example, a method, machine readable storage medium, and apparatus for optimizing product placement in a media is disclosed. As discussed above, product placement is an advertising technique in which a commercial product is placed in a scene of a media (e.g., a film, a television program, or other media). Placement of a product in a media is typically hard-coded through a manual process. That is, the placement typically takes place at the time the media is filmed, and cannot be modified or removed afterward without significant effort and/or expense. Thus, the same product is presented to all audiences in all locations, each time the media is viewed.

Examples of the disclosure automatically identify opportunities for product placement in a media. In some examples, these opportunities are identified after the media has been filmed or recorded. The opportunities could also be identified prior to or during the play of the recorded media. Further examples of the disclosure identify, from among a set of candidate advertisers, an advertiser whose product is best suited to be promoted in connection with the identified opportunity. The suitability of an advertiser's product in connection with the identified opportunity may be based on one or more static and/or dynamic factors, including demographics of the target audience (e.g., percentages of male and female viewers, average age of viewers), the location in which the media is played (e.g., city), the time at which the media is played (e.g., in the morning, before dinner time), the type of media being played (e.g., film versus television program), and other factors. Thus, examples of the present disclosure dynamically transform a media to seamlessly incorporate information about a product, where the placement of the product is specifically tailored for the intended audience. This maximizes the efficacy of the product placement from an advertising perspective, while minimizing the obtrusiveness of the placement from the audience perspective.

Although examples of the present disclosure are describes within the context of placing advertising material into a media, it will be appreciated that the apparatuses, methods, and computer readable media described herein could also be used to place non-commercial material in a media as well. For instance, examples of the present disclosure could just as easily be used to place educational, informational, or aesthetic material in a media.

Figure 1:
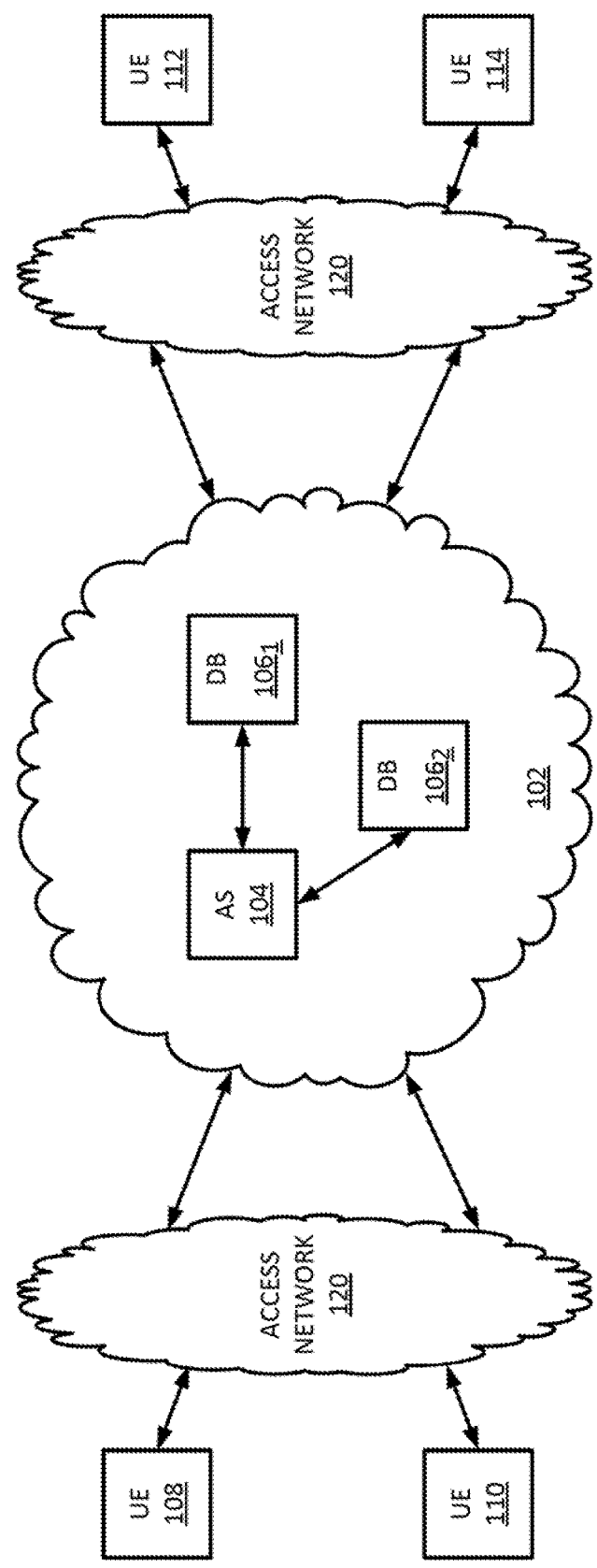
FIG. 1 depicts a high level block diagram illustrating one example of a communications network.

FIG. 1 depicts a high level block diagram illustrating one example of a communications network 100. The communications network 100 may be any type of communications network, such as for example, a traditional circuit switched or content distribution network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one example, the network 100 may comprise a core network 102. The core network 102 may be in communication with one or more access networks 120 and 122. The access networks 120 and 122 may include a wireless access network (e.g., a WiFi network and the like), a mobile or cellular access network, a PSTN access network, a cable access network, a wired access network and the like. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the core network 102 may include an application server (AS) 104 and a plurality of databases (DBs) $106_1$-$106_2$ (hereinafter collectively referred to as "databases 106" or "DBs 106"). Although only a single AS 104 and two DBs 106 are illustrated, it should be noted that any number of application servers 104 or databases 106 may be deployed.

Figure 3:
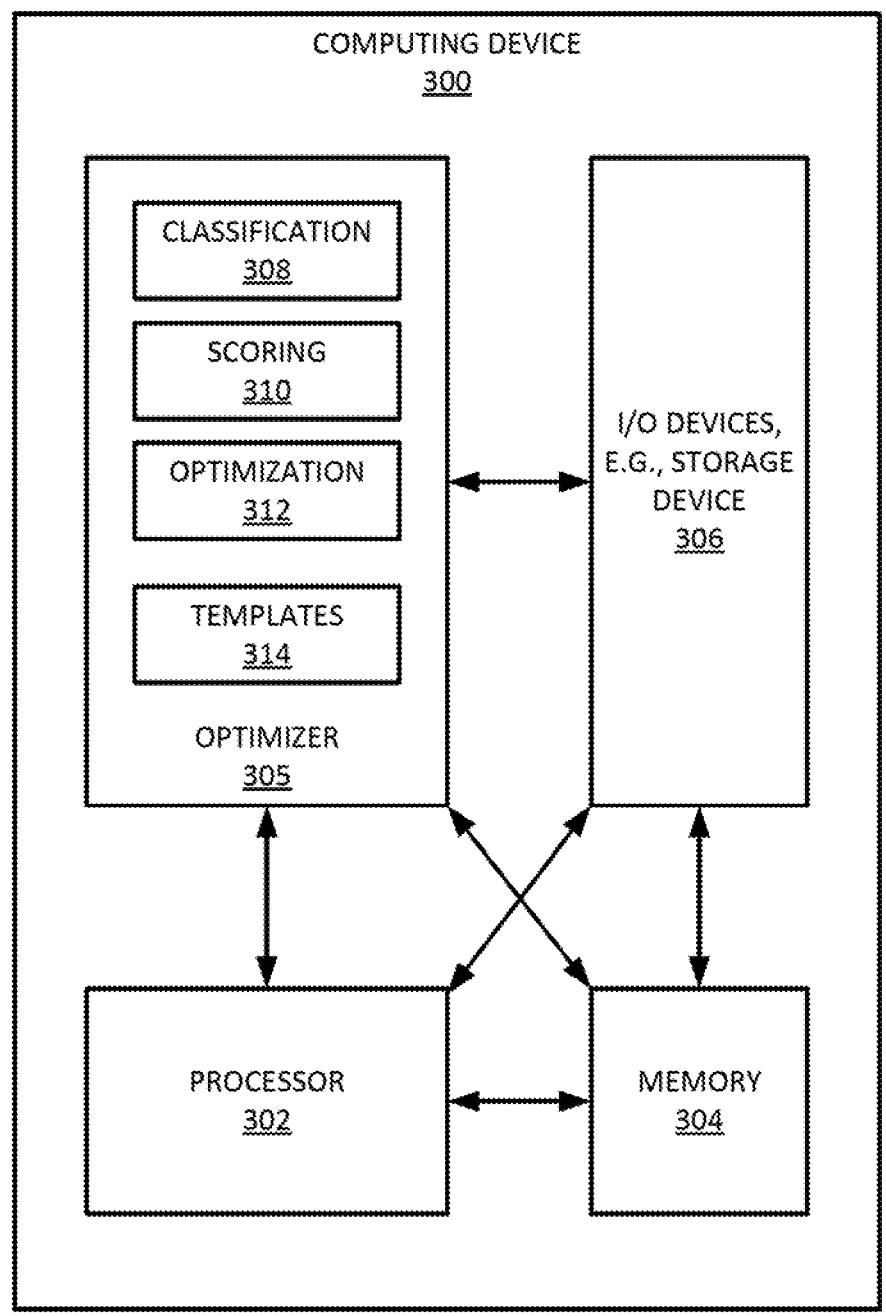
FIG. 3 depicts a high-level block diagram of an example computing device of the present disclosure.

In one example, the AS 104 may host an application for optimizing product placement in a media. As discussed in greater detail below, the AS 104 may exchange data with a user endpoint (UE) device and/or with the DBs 106 in order to analyze a media, identify objects in the media that may present opportunities for the placement of products, and retrieve and insert appropriate product information in the media. The AS 104 may be configured as illustrated in FIG. 3 and described in greater detail below.

In one example, one of the DBs 106, e.g., the DB $106_1$, stores and indexes data related to visual media (e.g., still images, films, television programs, video games, Internet videos, and the like). This information may include, for example, the frame identifiers, in-frame locations, and/or dimensions of objects depicted in the media that present opportunities for product placement. For instance, an entry in the DB $106_1$ for a particular film might indicate that the side of a bus is depicted during a sequence that spans frames $f_1$-$f_x$ of the film. The entry may further include the location and dimensions of the side of the bus, in these frames as well as the orientation of the side of the bus relative to the audience's view. The side of the bus may present a space on which an advertisement for a product could be inserted (e.g., as a banner).

In one example, one of the DBs 106, e.g., the DB $106_2$, stores advertising content (e.g., moving or still images of products or other advertising content). In one example, the advertising content is submitted by advertisers, who may register with the DB $106_2$. Each entry for a given item of advertising content may additionally specify use conditions for the given item of advertising content, such as appropriate audiences for the given item of advertising content, availability (e.g., geographic or otherwise) of the product depicted in the given item of advertising content, dimensions and scalability of the given item of advertising content, how much the advertiser is willing to pay for insertion of the given item of advertising content in a media (which may be scaled depending on the duration of time for which the given item of advertising content is displayed, the size and/or prominence of given item of advertising content in the media, the type of the media in which the given item of advertising content is displayed, and other factors).

In one example, the access networks 120 and 122 may be in communication with one or more user endpoint devices (also referred to as "endpoint devices" or "UE") 108, 110, 112, and 114. In one example, the user endpoint devices 108, 110, 112 and 114 may be any type of endpoint device such as a desktop computer or smart television or a mobile endpoint device such as a cellular telephone, a smart phone, a tablet computer, a laptop computer, a netbook, an ultrabook, a portable media device (e.g., an MP3 player), a gaming console, a portable gaming device, a set top box, microconsole, a digital media player, and the like, or even a wearable device such as a smart watch. Any of the user endpoint devices 108, 110, 112, and 114 may be configured as a computer similar to that illustrated in FIG. 3 and described in greater detail below. In one example, one or more of the UEs 108, 110, 112, or 114 may be configured to host an application that communicates with the AS 104 for selecting a product to be placed in a media. In another example, one or more of the UEs 108, 110, 112, or 114 may configured to host an application that selects the product to be placed in the media. In this case, the UE may be able to perform some or all of the functions performed by the AS 104. Thus, the UE could bypass the AS 104 and interact directly with the DB 106s as necessary. In some examples, one or more of the UEs 108, 110, 112, or 114 could include the display on which the media, and any selected products, are viewed. For instance, one or more of the UEs 108, 110, 112, or 114 could comprise a smart (e.g., Internet-ready) television, a smart phone, or a tablet computer that can be used both to view media and to communicate with the AS 104 and/or DBs 106.

It should also be noted that the network 100 has been simplified. For example, the network 100 may include other network elements (not shown) such as border elements, routers, switches, policy servers, security devices, firewalls, a content distribution network (CDN) and the like.

Figure 2:
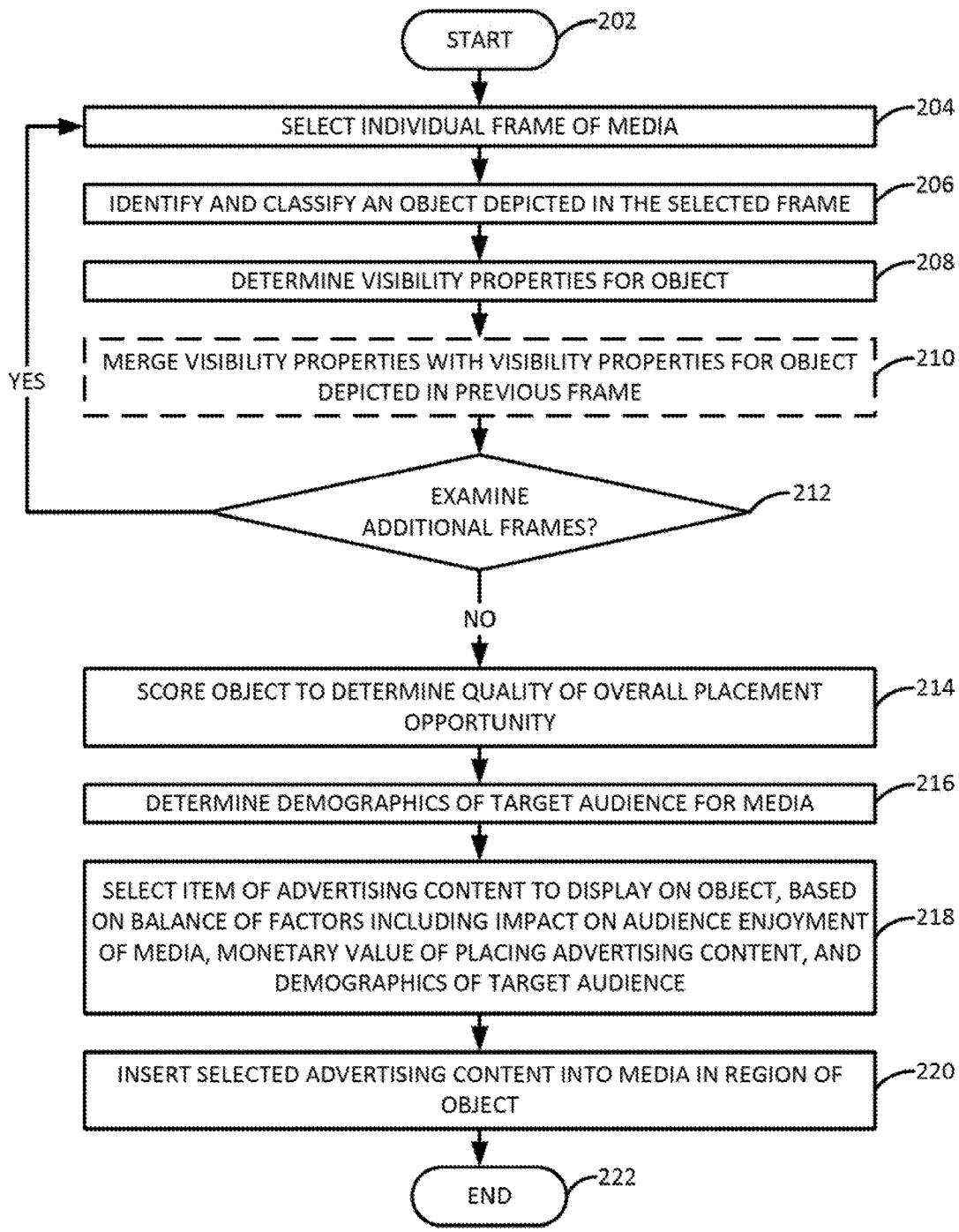
FIG. 2 is a flow diagram illustrating an example of a method for optimizing product placement in a media, according to the present disclosure.

FIG. 2 is a flow diagram illustrating an example of a method 200 for optimizing product placement in a media, according to the present disclosure. The method 200 may be performed, for example, by the AS 104 illustrated in FIG. 1. Alternatively, the method 200 could be performed by any of the UEs 108, 110, 112, or 114 of FIG. 1. The method 200 could also be performed in a distributed manner, with one or more of the UEs 108, 110, 112, or 114 performing some steps, and the AS 104 performing other steps. For the sake of example, reference is made in the discussion of the method 200 to the AS 104. However, such references are not intended to limit the means by which the method 200 may be performed.

The method 200 begins in step 202. In step 204, the AS 104 selects an individual frame of a media into which a product is to be placed. In one example, the media is a visual media, such as a still image, a film, a television program, a video game, or an Internet video. The media may be obtained in the form of an electronic signal that is streamed as a series of packets to the AS 104 from a source (e.g., a database) and temporarily stored (e.g., buffered) by the AS 104. Alternatively, the media may be obtained in the form of an electronic signal that is uploaded to the AS 104 and stored permanently by the AS 104. The media could also be read by the AS 104 from a tangible storage media, such as a digital video disk or a flash drive. Thus, the AS 104 may extract the selected frame from the electronic signal.

In step 206, the AS 104 identifies and classifies an object depicted in the selected frame. For instance, the object may be a human, an animal, a building, a vehicle, or another object that is depicted in the selected frame. In one example, a plurality of objects are identified and classified in step 206. In one example, one or more computer-implemented object recognition techniques are employed to identify and classify the object in step 206.

In step 208, the AS 104 determines the visibility properties for the object(s) that was identified and classified in step

206. The visibility properties of an object describe the conditions under which the object is visible to a viewer. For instance, the visibility properties for a given object may include the object's size, spatial properties within the selected frame (e.g., location, orientation, size, etc.), spatial properties with respect to the viewer (e.g., orientation to view), duration of visibility (e.g., number of frames or seconds for which the object is visible), and/or usage context (e.g., type of object and types of surrounding objects). In one example, one or more computer-implemented object recognition techniques are employed to determine the visibility properties of the object in step 208.

In optional step 210, the AS 104 may merge the visibility properties determined in step 208 with visibility properties for the same object that were determined in accordance with previously analyzed frames of the media. For instance, a given object may be depicted across multiple frames of the media. Depending on for how many frames the object is depicted, the overall visibility properties of the object may vary. For instance, the duration of the object's visibility may depend on the number of frames for which the object is visible.

In step 212, the AS 104 decides whether to examine additional frames of the media. For instance, depending on the type of the media (e.g., still image, film, television broadcast), the amount of time available to optimize product placement (e.g., how far in advance of a scheduled viewing of the media the method 200 is being performed), and other factors, the AS 104 may examine the entire media (e.g., all frames) or may examine a select portion of the media (e.g., a specific subset of all of the frames). The amount of time available to optimize the product placement is variable and may be defined by a human user.

If the AS 104 decides in step 212 that additional frames of the media should be examined, then the method 200 returns to step 204, and the AS 104 selects a next frame of the media. However, if the AS 104 decides in step 212 that additional frames of the media should not be examined, then the method 200 proceeds to step 214.

In step 214, the AS 104 scores the object(s) that has been identified and classified for object visibility. In one example, scoring the object visibility of an object comprises aggregating at least some of the visibility properties determined in step 208 to determine the quality of an overall product placement opportunity represented by the object in the media. For instance, individual scores assigned to various visibility factors (e.g., the object's size, the object's spatial properties within the selected frame, the object's spatial properties with respect to the viewer, the object's duration of visibility, and/or the object's usage context) may be summed to produce an overall object visibility score that quantifies the object's visibility in the media. In some examples, at least some of the individual scores may be multiplied by weights to assign varying levels of importance to different factors. For instance, the duration for which the object is visible may be more important that the size of the object in some contexts.

In step 216, the AS 104 determines the demographics of the target audience for the media. The demographics may include, for instance, the size of the audience (e.g., total number of people in the audience), the area/size/geographic scope of the audience (e.g., geographic region in which the media is to be shown), gender composition of the audience (e.g., percentages of the audience that are male or female), age composition of the audience (e.g., percentages of the audience that fall into various age ranges, or average age of audience), and the context of the media view (e.g., whether the media is a film, a television broadcast, a still image, etc.). The audience demographics may be supplied to the AS 104 via an electronic signal, e.g., from a UE, where a human user manually inputs the information into the UE. Alternatively, the electronic signal may be relayed from a database that collects and stores information relating to, for example ticket sales at a cinema or subscriber information for a television service provider (e.g., a cable or satellite television service provider). Thus, the AS 104 may extract the audience demographics from the electronic signal.

In step 218, the AS 104 selects an item of advertising content (e.g., an item stored in the DB 106₂) that is suited for display on the object that has been identified and classified. In one example, step 218 seeks to optimize selection of the item of advertising content by balancing a plurality of considerations, including one or more of: the impact that placement of the item of advertising content would have on the artistic integrity and/or audience enjoyment of the media (e.g., ability of the item of advertising content to "blend in"), the monetary value of placement of the item of advertising content (e.g., how much the advertiser is willing to pay based on the conditions of the placement in the media), the demographics of the target audience (e.g., the suitability of the product associated with the item of advertising content for the target audience, based on audience gender makeup, age, location, etc.), and/or other considerations.

In step 220, the AS 104 digitally inserts the selected item of advertising content into the media, e.g., in the region of the object that has been identified and classified. In one example, insertion of the item of advertising content may include creating a sequence of morphology region templates and associated insertion metadata that describe how to insert the item of advertising content and how to display the item of advertising content over time. The sequence of morphology templates may be applied to one or more frames of the media in order to transform the frames so that they display the selected item of advertising content in the selected region(s).

The method 200 ends in step 222.

As discussed above, examples of the present disclosure attempt to optimize product placement based on a variety of factors, including characteristics of the product being placed, characteristics of the media (and specific segment of the media) into which the product is being placed, and characteristics of the target audience for the media. Thus, examples of the present disclosure may produce different results based on various combinations of these factors.

For instance, the media may be a pre-recorded film that is scheduled to be shown at a cinema in the city center of Melbourne, Australia. The cinema may determine, shortly before the scheduled show time, that the audience comprises approximately one hundred adults, sixty percent of whom are male and forty percent of whom are female. The AS 104 (or an on-premises UE) may determine, based upon application of the method 200, that a particular sequence of frames in the film depicts a moving bus for four seconds. The moving bus may receive a high object visibility score due to its large visible area to the audience, lasting duration of visibility, and prominence in the audience viewing area. The viewable surface of the bus may have a low detected information content (e.g., no words detected on the viewable surface of the bus). Accordingly, the AS 104 may insert advertising content for a sale at a local retail outlet as a banner within an advertising space on the side of the bus. Insertion of the advertising content may be performed dynamically, e.g., a few minutes prior to the scheduled show time.

Alternatively, the media may be a film that a viewer is watching at home, on his/her television. An hour into the film, the AS 104 (or an on-premises UE, such as a set top box or smart television) may determine that it is close to the time at which the viewer normally eats dinner. The AS 104 may further determine that there is an upcoming sequence of frames (e.g., occurring at least a predefined number of frames after a frame that is currently being viewed) in the film that depict a woman typing on a laptop computer. The back of the laptop computer's display may be visible to the audience for approximately five seconds. The AS 104 may further determine that a local pizzeria has registered with the DB $106_2$ and is willing to pay for a product placement within a window of time that overlaps with the present time. Thus, the AS 104 may insert advertising content for the pizzeria, e.g., either superimposed over the entirety back of the laptop computer's display or as a small decal on the back of the laptop computer's display. In this case, a user profile including user information and viewing preferences (e.g., including when the user normally eats dinner) may be stored, either locally in an on-premises UE or in a remote database in the core network 102. The user profile may store additional information relating to the viewing habits of a particular user, such as the particular user's search history for media and/or commercial products, media included in a stored playlist associated with the particular user, and other information. Insertion of the advertising content in this example may thus take place simultaneously with delivery of the media to the audience The flowcharts and block diagrams in the Figures illustrate the architecture, functionality, and operation of possible implementations of systems and methods according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

FIG. 3 depicts a high-level block diagram of an example computing device 300 of the present disclosure. As an example, the AS 104 or any of the UEs 108, 110, 112, or 114 of FIG. 1 may be implemented as the computing device 300. In one example, the computing device 300 is configured to host an application for optimizing product placement in a media. The examples of the present disclosure improve the operation and functioning of the computing device 300 to enhance media with product placements that are optimized for the media, the products, and the audience, as disclosed herein.

When implemented as a user endpoint device, the computing device 300 may be part of a desktop computer or smart television or a mobile endpoint device such as a cellular telephone, a smart phone, a tablet computer, a laptop computer, a netbook, an ultrabook, a portable media device (e.g., an MP3 player), a gaming console, a portable gaming device, a set top box, microconsole, a digital media player, and the like, or even a wearable device such as a smart watch.

As depicted in FIG. 3, the computing device 300 comprises a hardware processor element 302 (e.g., a central processing unit (CPU), a microprocessor, or a multi-core processor), a memory 304, e.g., random access memory (RAM) and/or read only memory (ROM), a module 305 for optimizing product placement in a media, and various input/output devices 306 (e.g., storage devices, including but not limited to, a tape drive, a floppy drive, a hard disk drive or a compact disk drive, a receiver, a transmitter, a speaker, a display, a speech synthesizer, a network interface card (NIC), an output port, an input port, and a user input device (such as a keyboard, a keypad, a mouse, a microphone and the like)). Although only one processor element is shown, it should be noted that the computing device 300 may employ a plurality of processor elements. Furthermore, although only one computing device 300 is shown in the figure, if the methods as discussed below are implemented in a distributed manner for a particular illustrative example, i.e., the steps of the below methods or the entire methods are implemented across multiple computing devices, then the computing device 300 of this figure is intended to represent each of those multiple computing devices.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the respective systems and/or methods discussed below can be used to configure a hardware processor to perform the steps functions and/or operations of the systems and methods disclosed herein. In one example, instructions and data for the present module or process 305 for optimizing product placement in a media (e.g., a software program comprising computer-executable instructions) can be loaded into memory 304 and executed by hardware processor element 302 to implement the steps, functions or operations as discussed herein in connection with the disclosed systems and methods. For instance, the module 305 may include a plurality of programming code components, including an object classification component 308, an object scoring component 310, an optimization component 312, and a template generating component 314.

The object classification component 308 may be configured to identify, classify, and determine the visibility properties of objects depicted in a frame of a media, e.g., in a manner similar to steps 206-208 of FIG. 2.

The object scoring component 310 may be configured to calculate a score for an object depicted in a frame of a media, based on the object's visibility properties, e.g., in a manner similar to step 214 of FIG. 2.

The optimization component 312 may be configured to select an item of advertising content for display on an object depicted in a media based on a balance of a plurality of actors, e.g., in a manner similar to step 218 of FIG. 2.

The template generating component 314 may be configured to generate a morphology region template for inserting an item of advertising content into a frame of a media, e.g., in a manner similar to step 220 of FIG. 2.

The processor executing the computer readable or software instructions relating to the below described methods can be perceived as a programmed processor or a specialized processor. As such, the present module 305 for optimizing product placement in a media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor 302 can be configured or programmed to cause other devices to perform one or more operations as discussed above. In other words, the hardware processor 302 may serve the function of a central controller directing other devices to perform the one or more operations as discussed above.

Thus, the disclosed methods for optimizing product placement in a media may be performed by a user endpoint device communicating with a remote application server that performs most or all of the processing (and which, in turn, accesses a remote database). Alternatively, most or all of the processing may be performed locally by the user endpoint device, which has direct access to the remote database. In further examples, each of the user endpoint device and the application server may perform specific portions of the processing (e.g., one could perform object classification and scoring, while the other optimizes selection of advertising content). Division of processing responsibilities may depend on the processing power of the user endpoint device. For instance, if the processing capabilities of the user endpoint device are relatively powerful, then the user endpoint device may be able to perform the methods disclosed herein without assistance from the application server. However, if the user endpoint device's processing capabilities are limited, then the application server may perform the bulk of the processing.

Examples of the present disclosure may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a database signal from a database that collects and stores information;
   determining, by extracting from the database signal, a total number of people in a target audience for a viewing of a visual media;
   extracting a frame of the visual media from an electronic signal;
   identifying an object that is visible in the frame of the visual media;
   generating a score for the object that quantifies a visibility of the object in the frame, wherein the score comprises an aggregation of a plurality of scores, wherein each score of the plurality of scores is associated with a visibility property of a plurality of visibility properties, wherein each score of the plurality of scores is assigned a weight of a plurality of weights, wherein the plurality of weights includes at least two different weights, and wherein the plurality of visibility properties includes at least a size of the object, a usage context of the object within the frame, and a duration of the object's visibility over multiple frames of the visual media;
   determining, based on the score for the object, that the object comprises an optimal location in which to insert an item of advertising content;
   selecting the item of advertising content, wherein the selecting is optimized for at least the total number of people in the target audience, wherein the selecting balances the total number of people in the target audience against an obtrusiveness of a placement of the item of advertising content in the visual media; and
   digitally inserting the item of advertising content into the frame of the visual media, in a region of the object, wherein the digitally inserting comprises applying a morphology region template to the frame to transform the frame so that the item of advertising content is displayed in the region of the object.

2. The computer-implemented method of claim 1, wherein the selecting is further optimized for a geographic scope of the target audience.

3. The computer-implemented method of claim 1, wherein the selecting is further optimized for an age composition of the target audience.

4. The computer-implemented method of claim 1, wherein the plurality of visibility properties further includes a spatial property of the object within the frame.

5. The computer-implemented method of claim 1, wherein the selecting further balances the total number of people in the target audience against a monetary value of a placement of the item of advertising content in the region of the object.

6. The computer-implemented method of claim 1, wherein the method is performed simultaneously with the visual media being delivered to the target audience.

7. The computer-implemented method of claim 1, wherein the frame occurs at least a predefined number of frames later in a sequence than a frame that is currently being displayed to the target audience.

8. A non-transitory machine-readable storage medium encoded with instructions executable by a processor, wherein the instructions comprise:
   instructions to receive a database signal from a database that collects and stores information;
   instructions to determine, by extracting from the database signal, a total number of people in a target audience for a viewing of a visual media;
   instructions to extract a frame of the visual media from an electronic signal;
   instructions to identify an object that is visible in the frame of the visual media;
   instructions to generate a score for the object that quantifies a visibility of the object in the frame, wherein the score comprises an aggregation of a plurality of scores, wherein each score of the plurality of scores is associated with a visibility property of a plurality of visibility properties, wherein each score of the plurality of scores is assigned a weight of a plurality of weights, wherein the plurality of weights includes at least two different weights, and wherein the plurality of visibility properties includes at least a size of the object, a usage context of the object within the frame, and a duration of the object's visibility over multiple frames of the visual media;
   instructions to determine, based on the score for the object, that the object comprises an optimal location in which to insert an item of advertising content;
   instructions to select the item of advertising content, wherein the selecting is optimized by balancing the total number of people in the target audience against an impact that a placement of the item of advertising content in the region of the object has on an artistic integrity of the visual media, wherein the selecting balances the total number of people in the target audience against an obtrusiveness of a placement of the item of advertising content in the visual media; and
   instructions to digitally insert the item of advertising content into the frame of the visual media, in a region of the object, wherein the digitally inserting comprises applying a morphology region template to the frame to transform the frame so that the item of advertising content is displayed in the region of the object.

9. An apparatus, comprising:
   a hardware processor element; and a plurality of programming code components that, when executed by the hardware processor element, cause the hardware processor element to perform operations comprising:
receiving a database signal from a database that collects and stores information;
determining, by extracting from the database signal, a total number of people in a target audience for a viewing of a visual media;
extracting a frame of the visual media from an electronic signal;
identifying an object that is visible in the frame of the visual medial;
generating a score for the object that quantifies a visibility of the object in the frame, wherein the score comprises an aggregation of a plurality of scores, wherein each score of the plurality of scores is associated with a visibility property of a plurality of visibility properties, wherein each score of the plurality of scores is assigned a weight of a plurality of weights, wherein the plurality of weights includes at least two different weights, and wherein the plurality of visibility properties includes at least a size of the object, a usage context of the object within the frame, and a duration of the object's visibility over multiple frames of the visual media;
determining, based on the score for the object, that the object comprises an optimal location in which to insert an item of advertising content;
selecting the item of advertising content, wherein the selecting is optimized by balancing the total number of people in the target audience against an impact that a placement of the item of advertising content in the region of the object has on an artistic integrity of the visual media, wherein the selecting balances the total number of people in the target audience against an obtrusiveness of a placement of the item of advertising content in the visual media; and
digitally inserting the item of advertising content into the frame of the visual media, in a region of the object, wherein the digitally inserting comprises applying a morphology region template to the frame to transform the frame so that the item of advertising content is displayed in the region of the object.

10. The computer-implemented method of claim 1, wherein each weight of the plurality of weights reflects an importance of an associated visibility property of the plurality of visibility properties relative to other visibility properties of the plurality of visibility properties.

11. The computer-implemented method of claim 10, wherein the importance is dependent on a context in which the item of advertising context is to be used.

12. The computer-implemented method of claim 1, wherein the database collects and stores information relating to ticket sales.

13. The computer-implemented method of claim 1, wherein the database collects and stores information relating to subscriber information.

\* \* \* \* \*